United States Patent [19]

Kunzinger

[11] Patent Number: 4,710,801

[45] Date of Patent: Dec. 1, 1987

[54] SYSTEM FOR DECOMPOSITION OF NTSC COLOR VIDEO SIGNALS USING TWO FRAME BUFFERS

[75] Inventor: Charles A. Kunzinger, Morrisville, N.C.

[73] Assignee: International Business Machines Corporation, Armonk, N.Y.

[21] Appl. No.: 728,013

[22] Filed: Apr. 29, 1985

[51] Int. Cl.$^4$ .............................................. H04N 9/66
[52] U.S. Cl. ......................................... 358/23; 358/13
[58] Field of Search ........................ 358/11, 13, 31, 85, 358/22, 78, 23

[56] References Cited

U.S. PATENT DOCUMENTS

| | | | |
|---|---|---|---|
| 4,106,053 | 8/1978 | Mayemchuk | 358/11 |
| 4,335,395 | 6/1982 | Clarke | 358/11 |
| 4,498,100 | 2/1985 | Bunting et al. | 358/31 |
| 4,500,912 | 2/1985 | Bolger | 358/31 |
| 4,527,188 | 7/1985 | Lewis | 358/23 |

FOREIGN PATENT DOCUMENTS 55-123280  9/1980  Japan ..................................... 358/31

Primary Examiner—John W. Shepperd
Attorney, Agent, or Firm—Gerald R. Woods

[57] ABSTRACT

NTSC composite color video signals captured in a freeze-frame videoconferencing system can be decomposed into luminance and chrominance components using simple digital addition and subtraction. The necessary apparatus includes a conventional color camera, an analog-to-digital converter, and a superframe buffer, organized into four field buffers. The analog signal is sampled at phase angles which are displaced at 135 degree increments. The preferred phase angles are 0, 135, 270, 45, 180, 315, 90 and 225 degrees relative to the phase of the color burst for the current scan line. Due to the reversal of the color burst phase on a frame-to-frame basis, a luminance or Y value can be obtained for each pel by adding the digital values stored in corresponding pel positions in corresponding fields (odd or even) in two successive frames of the same image. A chrominance or C value can be obtained by subtracting the same two values. The I and Q components of chrominance can be obtained directly as a result of the subtraction process at certain of the angles or indirectly through calculation at other of the angles.

3 Claims, 8 Drawing Figures

FIG. 4

| FRAME | FIELD | ACTIVE VIDEO LINE | COLOR BURST PHASE (°) |
|---|---|---|---|
| A | ODD (1) | 1<br>2<br>3<br>4<br>⋮ | 0<br>180<br>0<br>180<br>⋮ |
| A | EVEN (2) | 1<br>2<br>3<br>4<br>⋮ | 180<br>0<br>180<br>0<br>⋮ |
| B | ODD (3) | 1<br>2<br>3<br>4<br>⋮ | 180<br>0<br>180<br>0<br>⋮ |
| B | EVEN (4) | 1<br>2<br>3<br>4<br>⋮ | 0<br>180<br>0<br>180<br>⋮ |

FIG. 6

| | | | | | | | | |
|---|---|---|---|---|---|---|---|---|
| LINE n (ODD) | 0<br>+ I | 135 | 270<br>− Q | 45 | 180<br>− I | 315 | 90<br>+ Q | 225 | 0 ⋯<br>+ I |
| LINE n (EVEN) | 180<br>− I | 315 | 90<br>+ Q | 225 | 0<br>+ I | 135 | 270<br>− Q | 45 | 180 ⋯<br>− I |
| LINE n+1 (ODD) | 180<br>− I | 315 | 90<br>+ Q | 225 | 0<br>+ I | 135 | 270<br>− Q | 45 | 180 ⋯<br>− I |
| LINE n+1 (EVEN) | 0<br>+ I | 135 | 270<br>− Q | 45 | 180<br>− I | 315 | 90<br>+ Q | 225 | 0 ⋯<br>+ I |
| LINE n+2 (ODD) | 0<br>+ I | 135 | 270<br>− Q | 45 | 180<br>− I | 315 | 90<br>+ Q | 225 | 0 ⋯<br>+ I |

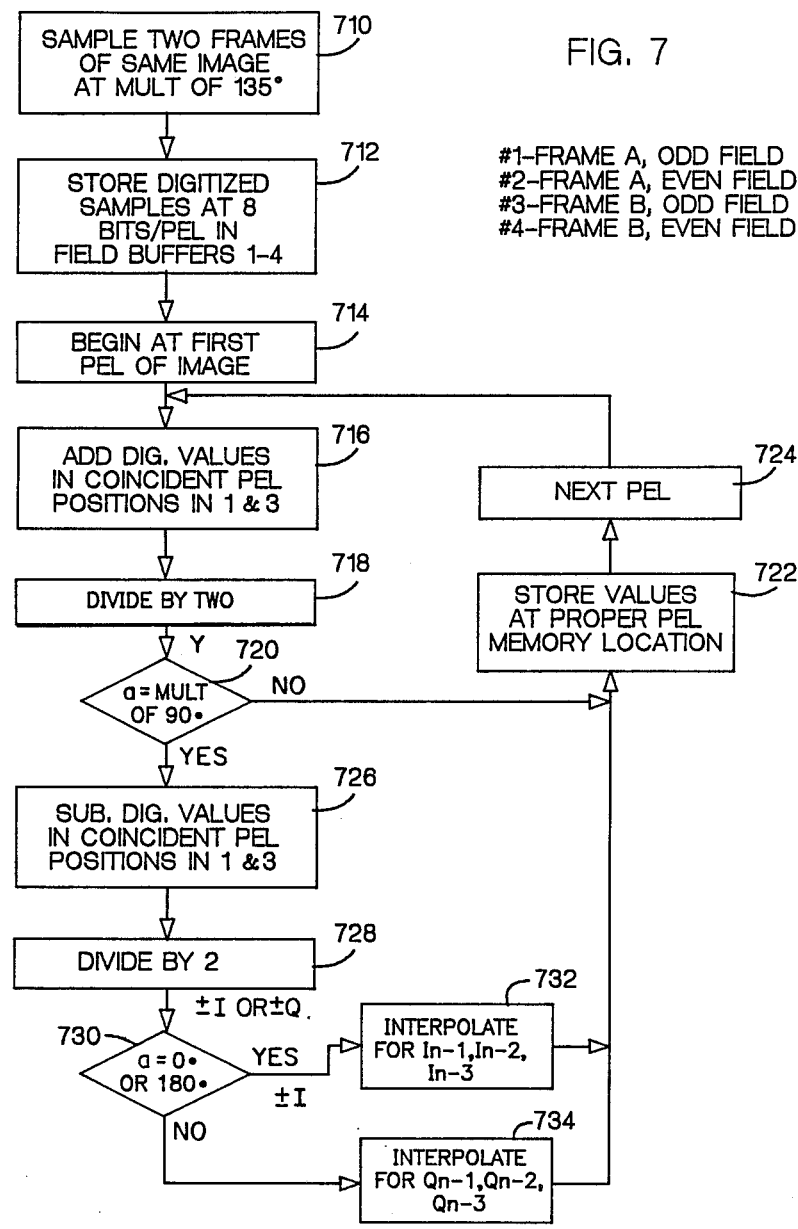

SYSTEM FOR DECOMPOSITION OF NTSC COLOR VIDEO SIGNALS USING TWO FRAME BUFFERS

BACKGROUND OF THE INVENTION

The present invention relates to image processing and more particularly to a system for decomposing NTSC color video signals into their Y-I-Q components to facilitate subsequent data compression.

Because travel costs are rising and because a traveler's time in transit can seldom be used productively, there is an increasing interest in the use of teleconferencing as an alternative to face to face business meetings between people from different locations. In a typical teleconferencing system, people in different cities or even different countries meet in special teleconferencing rooms at their respective home locations. Each room normally includes a room camera for capturing a wide angle view of the people, a document camera which can be focused on letters, drawings or other documents, a room monitor for permitting people in one room to see those in the other, and a document monitor for viewing documents being presented in the other room. Communications between the two rooms are established over conventional teleprocessing links, such as leased or switched telephone lines or satellite communication channels.

There has been a good deal of interest in the use of color video techniques in teleconferencing systems because information presented in the form of a color image is generally considered easier to comprehend than the same information presented in the form of a monochrome or gray scale image.

It is, of course, possible to use conventional video equipment and transmission techniques to provide what is referred to as full-motion teleconferencing; that is, teleconferencing in which the people in one room can watch those in the other room move about during the teleconference. The communications costs for conventional full-motion teleconferencing, particularly using color video, are high. A considerable amount of data must be transmitted at high rates, making it necessary to use a transmission medium having a high bandwidth. Communications costs are generally proportional to bandwidth. Therefore, any requirement for a high bandwidth runs counter to one of the primary reasons for using teleconferencing to begin with, namely, to reduce costs associated with the conduct of meetings.

To reduce communications costs, freeze-frame teleconferencing techniques may be employed. The video image captured by a room camera is updated only periodically, either at fixed intervals or on command of an operator. People at the receiver see the same "frozen" room image between updates. Audio signals are transmitted on a real time basis so that there is no perceptible delay in voice communications. Document images are updated only when the person presenting a document pushes a "send" button in the teleconferencing room.

There are two basic ways to reduce bandwidth requirements in a freeze-frame teleconferencing system. One of those ways is to reduce the amount of data that must be sent in order to recreate an acceptable image at the receiving location. The other of those ways is to use a lower bandwidth and simply take longer to transmit the data required to recreate an acceptable image at the receiving location.

The time required for transmission of necessary image data is important in any freeze-frame teleconferencing system since it determines the frequency with which images can be updated during the course of a teleconference. If meeting participants must sit and wait what they consider to be an excess amount of time for an expected video image, they are likely to become irritated, reducing the effectiveness of the teleconference.

In monochrome freeze-frame teleconferencing systems, the amount of data that must be sent can be reduced using known gray-scale data compression and run length coding techniques. Because monochrome image data can be manipulated and reduced using such techniques, it is possible to transmit necessary data at low bandwidths without requiring an excessive amount of time for the transmission.

A greater amount of data is required to define a single picture element (pel) in a color image than is required to define the same pel in a monochrome image. Because of the complexity of the data required to define a color pel, it has been generally assumed that color images could not be processed using the same kinds of data compression techniques that have been used on monochrome images.

Known freeze-frame color videoconferencing systems have avoided the potential problems and technical difficulties of color image compression by the simple expediency of transmitting uncompressed color data between teleconferencing locations. Where such systems use a high bandwidth transmission medium, the frequency with which images can be updated remains high, but so do the communications costs. Where such systems use low bandwidth transmission medium, an undesirable delay may be required between image updates.

Before it is possible to consider compression of color data in a video system, it is necessary to decompose each color signal to be processed into its components. Any color can be defined either in terms of R-G-B components or, alternatively, in terms of Y-I-Q components. These terms are described in greater detail below.

It is possible to analyze a given color using known vector analysis techniques and equipment. Such equipment is not suitable for use in a videoconferencing system, however, because it operates strictly in an analog domain and thus is not readily compatible with the digital data processing equipment normally used to control the operation of a videoconferencing system. Moreover, vector analysis equipment represents an added cost in a videoconferencing system. Finally, vector analysis equipment does not separate luminance and chrominance information with the accuracy required for a videoconferencing application.

It is also known to decompose a color signal using comb filtering techniques. A comb filtering technique is a spatial averaging technique in which samples on successive active video lines form a weighted average which can be used to determine the luminance and chrominance of a given point in an image. Comb filtering is not considered desirable in a video conferencing application since the necessary line-to-line averaging results in a loss of image resolution, usually in a vertical direction.

SUMMARY

The present invention is a system for decomposing NTSC standard analog video signals into their Y-I-Q or luminance and chrominance components. The system makes use of simple digital operations which can be performed readily and quickly by standard digital data processing equipment. The system does not result in any loss of image resolution.

The analog signals are digitized at predetermined sampling instants corresponding to recurring phase angle displacements relative to the phase of the color burst component of the analog input. The displacements include those at 0, 90, 180 and 270 degrees relative to the color burst phase. The digitized pel values are stored in memory locations corresponding to pel positions in four successive image fields. The luminance components for selected pels are established by adding the digitized stored pel values occupying corresponding coincident pel positions in corresponding fields in two successive frames. Since the two successive frames will be of the same image in a freeze frame system, the coincident pels represent the same image point in space. The chrominance components for the same selected pels are established by subtracting the digitized stored pel values.

BRIEF DESCRIPTION OF THE DRAWINGS

While the specification concludes with claims particularly pointing out and distinctly claiming that which is regarded as the present invention, details of a preferred embodiment of the invention may be more readily ascertained from the following technical description, when read in conjunction with the accompanying drawings, wherein:

FIG. 4 is a tabular representation of the color burst subcarrier phase for the odd and even fields of two successive frames;

FIG. 6 is representation of image sampling phase angles and video information which can be readily determined at certain of the angles;

FIG. 7 is a flow chart which is used to explain the logical steps performed when the invention is being practiced.

TECHNICAL DESCRIPTION

Figure 1:
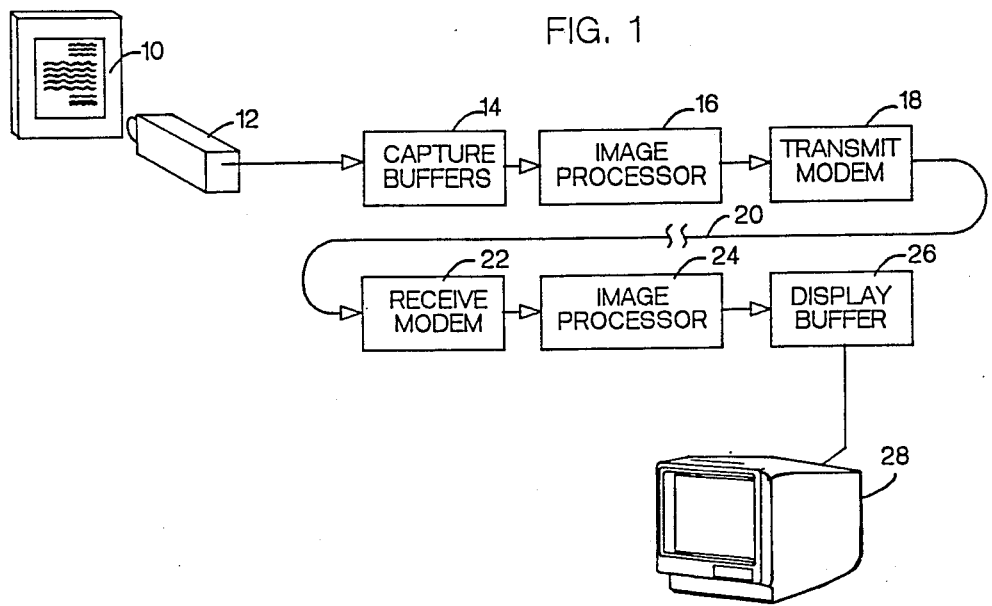
FIG. 1 is a block diagram of the transmitting portion of a videoconferencing system showing the environment in which the present invention is used.

FIG. 1 is a simplified block diagram of certain components in a videoconferencing system and is intended to show the environment in which the present invention is practiced. A color image, such as that presented by a document 10 for example, is captured using a conventional video camera 12. The captured data is digitized and stored in capture buffers 14. As will be explained in more detail later, two successive frames of the same image are captured, digitized and stored in buffers 14. Each frame consists of two fields (odd and even) with each field being stored in a separate buffer.

The digitized data is processed in image processor logic 16 which, as will be described in greater detail, decomposes the color video data on a pel-by-pel basis into Y-I-Q components. The decomposed data may be subjected to image compression operations, although such operations are not a part of the present invention, before being applied to a modem 18 which conditions the data for transmission over a conventional teleprocessing link to a receiving modem 22. In a preferred embodiment, the teleprocessing link consists of ordinary dial-up telephone lines. Received data is applied to image processor logic 24 at the receiving location. Logic 24 basically performs in the inverse of the operations performed by logic 16 at the transmitting location. That is, logic 16 decompresses the data and recomposes the received Y-I-Q data into composite color video data. The data is stored in a display buffer 26. Data retrieved from buffer 26 is converted to analog form and used to drive a conventional display monitor 28.

Video data processed using the present invention must meet NTSC standards.

The format of an NTSC color television signal is specified by its line rate, its synchronization signals, its field format, its frame format and its reference color subcarrier.

An NTSC frame consists of two fields, each of which is 262.5 lines long, resulting in 525 lines per frame. The first or odd field consists of twenty line times of sync signals, followed by 242.5 lines of active video. The second or even field consists of 19.5 line times of sync signals, followed by 243 lines of active video. The first half line of active video in the even field is blanked out.

The reference color subcarrier is a continuous sine wave whose frequency is 3.579545 MHz. The length of a single line is defined as 227.5 times the period of the color subcarrier. A color burst is obtained by inserting nine cycles of the reference color subcarrier at the beginning of each active video scan line. The phase of the color burst is measured relative to the leading edge of the horizontal sync pulse of each line and is nominally either 0 degrees or 180 degrees.

Figure 2:
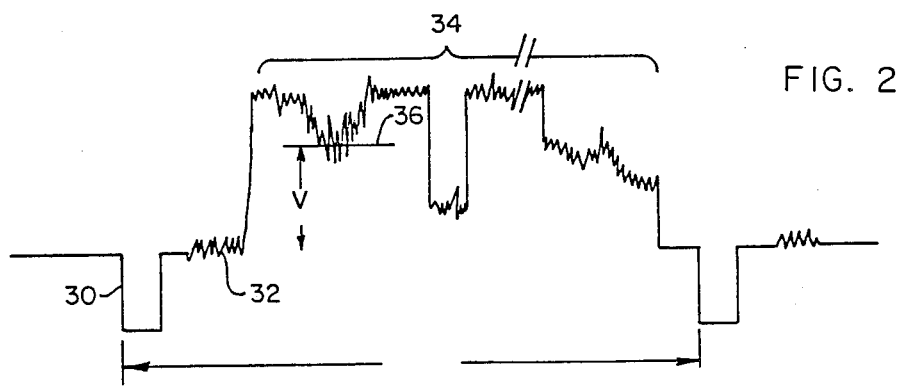
FIG. 2 is a waveform of an analog color video signal.

FIG. 2 is a waveform of one scan line in a television signal which complies with NTSC standards. The signal includes a horizontal synchronization (sync) pulse 30, a color burst 32 and active video 34. The active video portion 34 is a composite signal which contains both luminance (gray-scale) information and chrominance (color) information. The luminance at any point in the signal is indicated by a baseband signal component and is measured by the voltage difference between that point on the waveform and the top of the horizontal sync pulse. For example, the luminance at point 36 in the waveform is represented by the voltage differential V.

The chrominance information at any given point on the waveform is contained in the relatively low amplitude but high-frequency modulation added to the baseband or luminance waveform. The high-frequency color signals contain information about the hue and saturation of the color at that point in the composite video waveform. Hue is another name for color. For example, red and green have different hues, but pink and red have the same hue. Saturation is a measure of how much of a pure color has been diluted by mixture with white. For example, pink has the same hue as red but much less saturation. In an NTSC video signal, the phase of the color modulation waveform relative to the phase of the color burst determines the hue of the video image at that point. The peak-to-peak amplitude of the color modulation waveform determines the degree of saturation.

An NTSC color signal may be defined using either of two coordinate systems. The more widely known system is the R-G-B system. In the R-G-B system, any color is defined in terms of how much red, how much green and how much blue it contains. The same color can also be defined in terms of Y-I-Q components. The luminance of a color is indicated by the Y component. The chrominance of that color is indicated by the I and Q components. There is a one-to-one relationship between R-G-B coordinates and Y-I-Q coordinates. The formal transformations between the two coordinate systems can be expressed as:

$$\begin{vmatrix} Y \\ I \\ Q \end{vmatrix} = \begin{vmatrix} +0.30 & +0.59 & +0.11 \\ -0.62 & +0.52 & +0.10 \\ +0.15 & +0.29 & -0.43 \end{vmatrix} \begin{vmatrix} R \\ G \\ B \end{vmatrix}$$

and $$\begin{vmatrix} R \\ G \\ B \end{vmatrix} = \begin{vmatrix} +1.00 & -1.14 & -0.01 \\ +1.00 & +0.58 & +0.39 \\ +1.00 & -0.01 & -2.06 \end{vmatrix} \begin{vmatrix} Y \\ I \\ Q \end{vmatrix}$$

The present invention is a technique for decomposing the digital representation of successive samples of the analog waveform to establish Y-I-Q values which may be readily compressed. The technique, to be described in more detail later, relies on a well defined set of relationships as to the phase of the color burst relative to the horizontal sync pulse on a line-to-line, field-to-field and frame-to-frame basis.

Since each active video line in an NTSC signal is, by definition, 227.5 times the period of the color burst, the phase of the color burst relative to the horizontal sync pulse for a given line changes by 180 degrees on consecutive lines within a single field. As an example, if the color burst phase for line twentyfive in an even field is 0 degrees, then the color burst phase for line twentysix in the same field is 180 degrees.

Also since correspondingly numbered lines in the two fields (odd and even) in a single frame are separated from one another by 263 line times, the phase of the color burst also changes by 180 degrees between such lines in the two fields. For example, if the color burst phase for line forty of the odd field is 0 degrees, then the color burst phase for line forty of the even field is 180 degrees.

Finally, since there are 525 lines per frame, the phase of the color burst also changes by 180 degrees between correspondingly numbered lines in consecutive frames. As an example, if the color burst phase for line thirty of the even field in a frame is 0 degrees, the color burst phase for line thirty of the even field of the next frame is 180 degrees.

Figure 3:
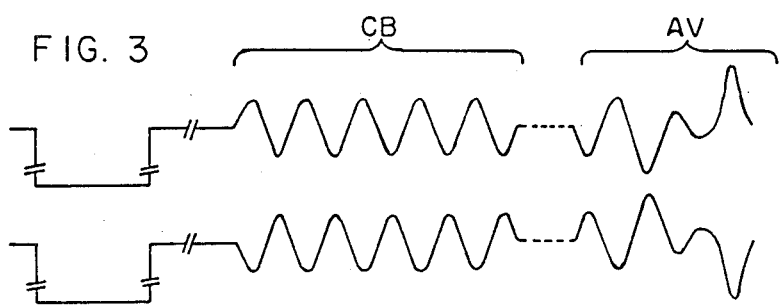
FIG. 3 is an enlarged view of a part of the color video signal showing the phase of a color burst subcarrier for two successive frames of the image.

FIG. 3 is an enlarged illustration of two analog waveforms following horizontal sync pulses. Each waveform includes a color burst section (CB) consisting of nine cycles of a constant amplitude sine wave at the frequency of the reference color subcarrier. Each waveform further includes an active video section (AV) in which the amplitude and phase of the signal varies in accordance with the colors in the image being scanned. The upper of the two waveforms could represent any given active video line. The lower of the two waveforms would represent either the next line in the same field, the correspondingly numbered line in the next field, or the correspondingly numbered line in the next frame.

The periodicity of the phase changes in the color burst relative to the horizontal sync pulse defines a superframe structure for an NTSC signal. As shown in FIG. 4, a superframe consists of two successive frames (Frame A and Frame B), each having both odd and even fields. FIG. 4 shows the nominal phase of the color burst for the first four lines of active video for each of the fields in this superframe.

Figure 5:
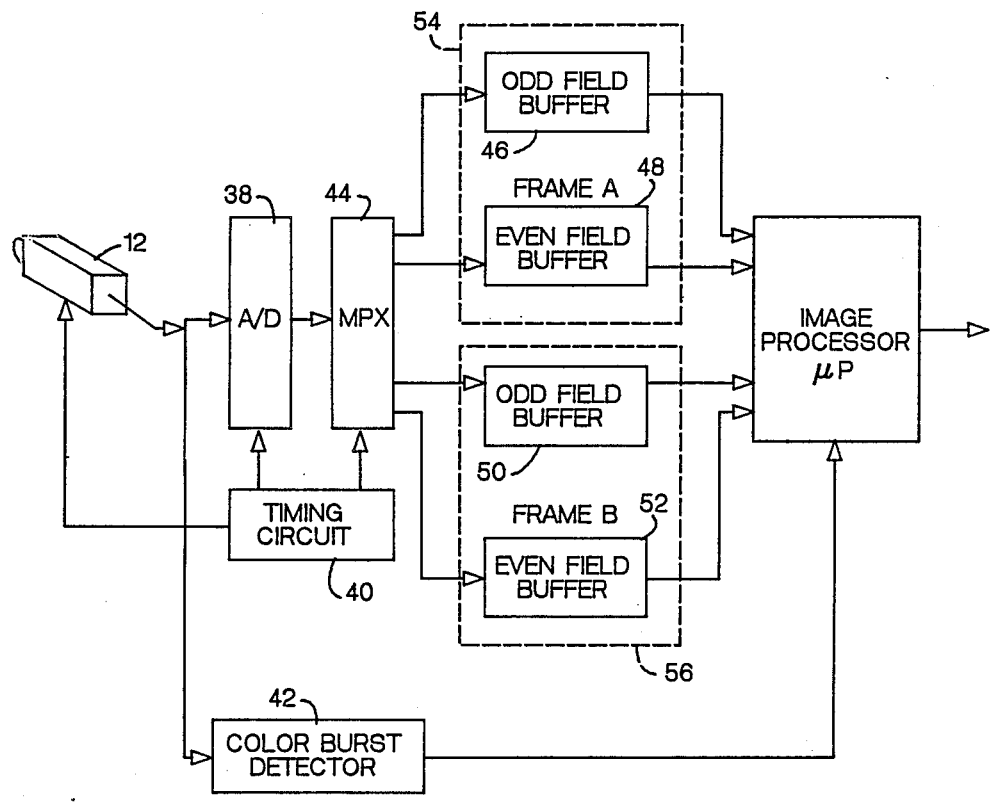
FIG. 5 is a block diagram of the hardware required to implement the present invention.

In a system which implements the present invention, each of the four fields in a superframe is captured and stored in a logically separate capture buffer. The basic components of such a system are described with reference to FIG. 5. The analog video signal generated by camera 12 is applied to an analog to digital converter 38, which samples the analog signal on a periodic basis and generates digital representations of the sampled analog value. The sampling rate is unique to the present invention as will be explained in more detail later. In a preferred embodiment of the invention, the digital representations have a resolution of $2^8$, which means that the digital signal may have any one of 256 values.

Analog video signals from camera 12 are also applied to a color burst detector 42, which is conventional in nature. The operations of camera 12 and the analog to digital converter 38 are synchronized by a free-running timing circuit 40 to assure that the analog signal is sampled and digitized only at predetermined instants. Timing circuit 40 also controls a multiplexer circuit 44 which distributes the analog signal among four buffer memories 46, 48, 50 and 52, which are organized into two frame buffers 54 and 56. For convenience, frame buffer 54 is said to hold Frame A of the video image while frame buffer 56 is said to hold Frame B of the same video image. As indicated in the Figure, buffer 46 stores the odd field of Frame A, buffer 48 stores the even field of Frame A, buffer 50 stores the odd field of Frame B and buffer 52 stores the even field of Frame B.

The buffers are connected to the image processor 16 which, as will be explained in more detail below, processes stored digital values from non-successive field buffers using simple processing algorithms in order to decompose those values into Y-I-Q components.

In terms of its Y-I-Q components, a composite NTSC signal at pel location (x,y) and time t is defined as:

$$s(x,y,t) = Y(x,y) + I(x,y)\cos(B(t)) + Q(x,y)\sin(B(t)) \qquad \text{Eq. 1}$$

where
Y(x,y) is the luminance,
I(x,y) is the I component of the chrominance,
Q(x,y) is the Q component of the chrominance,
B(t) is equal to 2 * pi * f(t), and
f is the reference color subcarrier frequency.

For any given color, none of the Y-I-Q components varies as a function of the location of a scanned point within the scanned image. On the other hand, the value of the composite signal and of its chrominance component, represented by the last two terms of the above equation, do vary depending on the location of the scanned point within the image.

The NTSC superframe structure mentioned above defines a signal format in which the phase of the color burst relative to the horizontal sync pulse is reversed from frame to frame. It follows that the chrominance portion of a composite NTSC signal will also be reversed in phase from one frame to the next. The active video (AV) portions of the two waveforms shown in FIG. 3 illustrate this phase reversal from one frame to the next where the same image is stored in both frame buffers. The reversal or 180 degree change in chrominance phase from one frame to the next is a key to demodulating or decomposing a digitized NTSC composite signal into its luminance and chrominance components.

As was described earlier with reference to FIG. 5, two successive image frames are captured, digitized and stored in the buffer memories of frame buffers 54 and 56. In a freeze frame teleconferencing system, the two successive image frames will actually be of the same image or scene in space. At a pel level, there will be two pels, one in each of the buffers, which are the result of scanning the same image point or point in space.

The two digitized values from the different frame buffers can be combined using simple addition and subtraction operations to derive the luminance and chrominance values for a given image point. Stated simply, the luminance value for any given point is established by adding the digital values for corresponding pels in the two frame buffers and dividing the result by two. Mathematically, if the pel stored in a given pel position in frame buffer A has a value $Y+I^*\cos(B(t))+Q^*\sin(B(t))$, then the corresponding pel in frame buffer B will have a value $Y+I^*\cos(B(t)+180)+Q^*\sin(B(t)+180)$. Since the cosine and sine of any angle + 180 degrees has the same value but the opposite algebraic sign from the sine and cosine for the angle itself, the addition of the stored digital values effectively cancels the I and Q components of the composite signal, leaving a result of 2Y. The division by two yields the Y or luminance component for a given image point.

The chrominance component of the same image point can be obtained by subtracting the second stored digital value from the first. The subtraction process eliminates the Y component and yields a value of 2C for C is a composite of the I and Q values for the image point.

The separation of the composite NTSC signal into its luminance and chrominance components is valid at any rate at which the analog video data may be sampled. As will be shown below, careful selection of the preferred sampling rate offers a number of computational advantages in further decomposing the chrominance component into its I and Q components.

For reasons which are not essential to an understanding of the present invention, the preferred sampling rate is 8/3 the color subcarrier frequency, which results in a phase change of 135 degrees between consecutive samples on the same line. It follows that there are only eight possible values for a sampling angle, namely, 0, 135, 270, 45, 180, 315, 90 and 225 degrees and that the sampling angles will occur in the order indicated for consecutive pel positions on a line.

After eight sampling points, the sequence of angles repeats itself. Also, because of the periodic nature of the NTSC signal format, the sampling phase repeats itself every four lines for a given position within a line. When the periodicity within a line is combined with the periodicity across a set of lines, a matrix of sampling phases that is eight pels wide and four lines deep can be seen to exist. This matrix repeats itself throughout an entire image, regardless of the number of pel positions within the image. This eight pel by four line matrix is shown in FIG. 6 along with the sampling angles for a fifth image line. As noted above, the sampling angles for the fifth image line are identical to the sampling angles for the first image line in the matrix.

Because the matrix repeats itself throughout the image, regardless of image size, the sinusoidal terms in the Y-I-Q definition of an NTSC signal can assume a very limited set of values. This property is used to simplify the computations for decomposing the chrominance into its I and Q components.

The process described above determines the luminance (Y) and chrominance (C) values for every pel in an image through simple addition and subtraction operations. The chrominance values for two successive pels on one line can be used to derive the I and Q values for each of the two pels, based on the assumption that the I and Q values will be constant over a two pel wide region. If the chrominance value C at pel position p is identified as C(p) and the chrominance value for the preceding pel is identified as C(p−1) and the sampling phase changes by 135 degrees between consecutive pel positions on a line, the following two equations define the chrominance values:

$$C(p)=I^*\cos(a)+Q^*\sin(a) \qquad \text{Eq. 2}$$

$$C(p-1)=I^*\cos(a-135)+Q^*\sin(a-135) \qquad \text{Eq. 3}$$

where a is the actual sampling angle at pel position p. These two equations can be solved as follows:

$$I=-1.414[C(p)^*\sin(a-135)-C(p-1)^*\sin(a)] \qquad \text{Eq. 4}$$

$$Q=+1.414[C(p)^*\cos(a-135)-C(-1)^*\cos(a)] \qquad \text{Eq. 5}$$

As indicated above, there are only eight possible values for the sampling angle. Therefore there are a limited number of solutions for equations 4 and 5 set forth immediately above. The solution can be expressed in matrix format as:

$$\begin{vmatrix} I \\ Q \end{vmatrix} = \begin{vmatrix} m1 & m2 \\ m3 & m4 \end{vmatrix} \begin{vmatrix} C(p) \\ C(p-1) \end{vmatrix} \qquad \text{Eq. 6}$$

where the values for the ±m' terms vary with the sampling angle a. A table of the ±m' terms for the different possible sampling angles follows:

| Sampling angle | m1 | m2 | m3 | m4 |
|---|---|---|---|---|
| 0 | 1.000 | 0.000 | −1.000 | −1.414 |
| 135 | 0.000 | 1.000 | 1.414 | 1.000 |
| 270 | −1.000 | −1.414 | −1.000 | 0.000 |
| 45 | 1.414 | 1.000 | 0.000 | −1.000 |
| 180 | −1.000 | 0.000 | 1.000 | 1.414 |
| 315 | 0.000 | −1.000 | −1.414 | 0.000 |
| 90 | 1.000 | 1.414 | 1.000 | 0.000 |
| 225 | −1.414 | −1.000 | 0.000 | 1.000 |

It will be noted that the only possible values for the ±m' terms are 0.000, +/−1.000 and +/−1.414.

As has been shown above, it is possible to determine the Y and C components of a pel in a composite NTSC signal using simple addition and subtraction of digital values in corresponding positions in two successive image frames. It is further possible to use the C component to calculate the I and Q values for a given pel using the equations expressed in matrix form as Equation 6 above.

It is also possible to derive the I and Q values directly for certain sampling angles without the type of computations required for Equation 6. Within the set of allowed sampling angles, four (0, 90, 180, 270) are of special significance. At these angles, one of the two terms of Equation 2 is equal to zero while the other is equal to the positive or negative value of either I or Q. More specifically, Equation 2 can be solved for the following I or Q values directly at the indicated sampling angles:

| Sampling Angle | C(p) |
|---|---|
| 0 | +I |
| 90 | +Q |
| 180 | −I |
| 270 | −Q |

FIG. 6 shows the I and Q values which can be obtained directly at the indicated sampling angles. It will be recalled that C(p) itself is obtained through the simple subtraction of digitized pel values stored in corresponding pel positions in the two frame buffers. Therefore, as indicated in the Figure, both I and Q values can be obtained directly through the subtraction process at every fourth pel position in the image.

In one embodiment of the invention, the luminance or Y value is calculated at every pel position through the described addition process, the I component is obtained by performing the subtraction process for pels obtained by sampling at angles of 0 and 180 degrees, and the Q component is obtained by performing the subtraction process for pels obtained by sampling at angles of 90 and 270 degrees. I and Q components for pels at angles other than those indicated can be obtained by interpolating between directly obtained I and Q values.

FIG. 7 is a flow chart which describes the implementation referred to above. Two successive video frames of the same image are obtained (block 710) by sampling the analog video signal at sampling angles which are multiples of 135 degrees. The resulting digital values are stored in four field buffers (block 712). As indicated in the Figure, buffers 1 and 2 store the odd and even fields, respectively, in frame A while buffers 3 and 4 store the odd and even fields, respectively, in frame B.

The process of decomposing the digitized composite signal into its Y-I-Q components begins at the first pel in the image (block 714). The digital values stored in the coincident or corresponding pel positions in buffers 1 and 3 are added (block 716) and the result is divided by 2 (block 718) to obtain the Y component for the pel.

If the sampling angle is not a multiple of 90 degrees (block 720), the Y value obtained is stored in an appropriate location in a pel memory (block 722) and the next pel is selected (block 724) for the decomposition process.

The sequence of steps described above is repeated until the sampling angle is a multiple of 90 degrees. When that occurs, the digitized values stored in the selected pel position in buffers 1 and 3 are subtracted (block 726) and the result divided by two (block 728) to obtain a value which may be +/−I or +/−Q depending on the sampling angle.

If the sampling angle is either 0 or 180 degrees (block 730), the value obtained is +/−I. Given that value and the I value which would have been obtained four pels earlier on the same line, an interpolation process can be performed (block 732) to obtain I values for the intermediate pel positions.

If the sampling angle is not 0 or 180 degrees, then it must be either 90 or 270 degrees, which means that the result obtained at block 728 is +/−Q. An interpolation process (block 734) can be performed to obtain Q values for the three pels preceding the current pel.

All Y-I-Q values obtained are stored in appropriate pel position locations in the pel memory, where they will be available for image compression operations. It should be noted that a Y value is obtained directly and is stored for every pel position. I and Q values are obtained directly every four pels and indirectly, through interpolation, at other pel positions.

Figure 8:
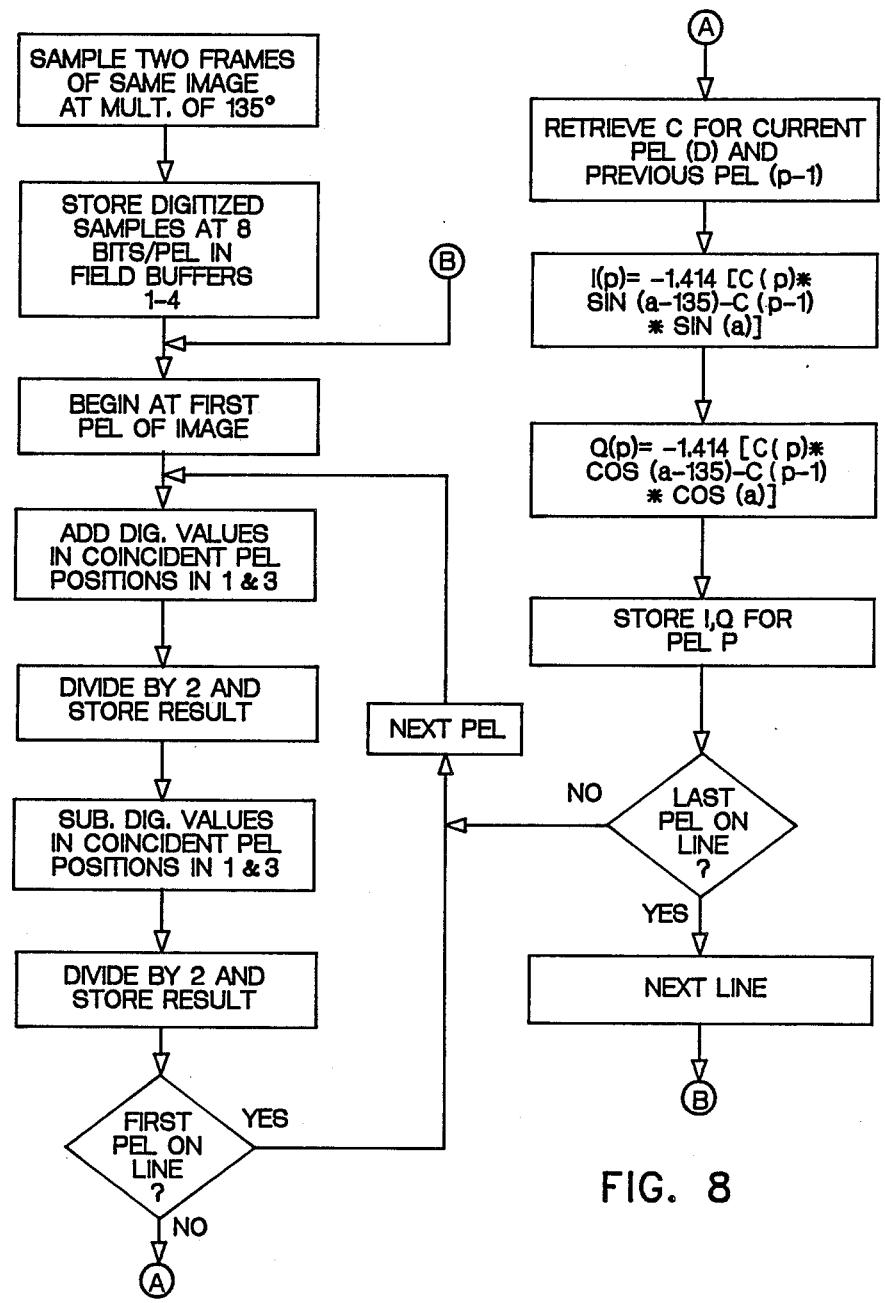
FIG. 8 is a flow chart of the steps which are performed to directly calculate Y, I and Q values for each pel location.

FIG. 8 is a flow chart of the steps required to directly calculate Y, I and Q values for every pel location in an image. The process is similar to that illustrated in FIG. 7 through the steps of determining the luminance (Y) and chronminance (C) values for each pel in the image. As was discussed earlier with reference to equations 4 and 5, the chrominance values for two succesisve pels in a line can be used to directly calculate the I and Q values for one of those pels. The calculations are illustrated in FIG. 8 as well as in Equations 4 and 5.

While there have been described what are considered to be preferred embodiments of the present invention, variations and modifications therein may occur to those skilled in the art once they become acquainted with the basic inventive concepts. Therefore, it is intended that the appended claims shall be construed to include not only the described embodiments but all such variations and modifications as fall within the true spirit and scope of the invention.

We claim:

1. For use in a freeze frame video system having an analog input conforming to NTSC color signal standards, a method for decomposing composite NTSC signals into luminance (Y) and chrominance (C) components comprising the steps of:

digitizing the analog input at predetermined sampling instants corresponding to recurring phase angle displacements relative to the phase of the color burst component of the analog input, said displacements including those at ±90° and 180° relative to the color burst phase;

storing the digitized pel values in memory locations corresponding to pel positions in four successive image fields;

establishing Y values for selected pels as a function of the sum of stored digitized pel values occupying corresponding coincident pel positions in non-successive fields;

establishing C values for selected pels as a function of the difference between stored digitized pel values occupying corresponding coincident pel positions in non-successive fields; and deriving I and Q values based on the established C value for each selected pel, said deriving step comprising the further steps of retrieving the established C values for two successive pels p and p-1 on a given line, solving the below stated equations for I and Q $$I = -1.414[C(p)*\sin(a-135) - C(p-1)*\sin(a)]$$

$$Q = +1.414[C(p)*\cos(a-135) - C(p-1*\cos(a)]$$

where a is the sampling angle phase for pel position p, nd assigning the calculated I and Q values of both of the pels p and p−1.

2. The method as defined in claim 1 wherein the sampling angles are displaced from one another by 135°, increments and are limited to angles of 0°, 135°, 270°, 45°, 180°, 315°, 90° and 225°.

3. A system for decomposing NTSC color video signals captured by a video camera comprising:
- a pair of image frame buffers, each having an odd field buffer and an even field buffer;
- means for sampling the analog signals produced by the video camera at predetermined sampling instants corresponding to recurring phase angle displacements relative to the phase of the color burst component of the analog signals, said displacements including those at ±90° and 180° relative to the color burst phase;
- means for digitizing analog signals produced by said sampling means;
- means for directing a first frame of digitized data into one of said image frame buffers and a second frame of digitized data into the other of said image frame buffers;
- means for processing digitized data stored at selected coincident pel positions in corresponding field buffers in the pair of frame buffers, said processing means further including means for adding the digitized data to derive a luminance value for the pel at the selected position and means for subtracting the digitized data to derive a chrominance value for the same said processing means further including
- means for retrieving established chrominance values for two successive pels p and p−1 on a given line,
- means for solving the following equations for I and Q $$I = -1.414[C(p)I\sin(a-135) - C(p-1)*\sin(a)]$$

$$Q = +1.414[C(p)*\cos(a-135) - C(p-1)*\cos(a)]$$

where C is the established chrominance value for the pel in the indicated position and a is the sampling angle phase for the pel p; and
- means for assigning the calculated I and Q values to both of the pels p and p−1.

* * * * *